(12) United States Patent
Stomakhin

(10) Patent No.: US 11,417,043 B2
(45) Date of Patent: *Aug. 16, 2022

(54) METHOD FOR GENERATING SIMULATIONS OF THIN FILM INTERFACES FOR IMPROVED ANIMATION

(71) Applicant: UNITY TECHNOLOGIES SF, San Francisco, CA (US)

(72) Inventor: Alexey Stomakhin, Waimanalo, HI (US)

(73) Assignee: Unity Technologies SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,293

(22) Filed: Nov. 18, 2021

(65) Prior Publication Data

US 2022/0076477 A1    Mar. 10, 2022

Related U.S. Application Data

(63) Continuation of application No. 17/184,530, filed on Feb. 24, 2021, now Pat. No. 11,270,490.

(60) Provisional application No. 63/038,477, filed on Jun. 12, 2020.

(51) Int. Cl.
*G06T 13/40* (2011.01)
*G06T 13/60* (2011.01)

(52) U.S. Cl.
CPC .............. *G06T 13/40* (2013.01); *G06T 13/60* (2013.01); *G06T 2210/21* (2013.01); *G06T 2210/24* (2013.01)

(58) Field of Classification Search
CPC ..... G06T 13/40; G06T 13/60; G06T 2210/21; G06T 2210/24
See application file for complete search history.

(56) References Cited

U.S. PATENT DOCUMENTS

| 9,811,941 B1 | 11/2017 | Hankins et al. |
| 2015/0242545 A1 | 8/2015 | Cho et al. |
| 2017/0243388 A1* | 8/2017 | Jamriska ................. G06T 13/60 |
| 2018/0075173 A1 | 3/2018 | Stomakhin |
| 2019/0362035 A1* | 11/2019 | Jeschke ................... G06F 30/20 |

OTHER PUBLICATIONS

Wang H, Mucha PJ, Turk G. Water drops on surfaces. ACM Transactions on Graphics (TOG). Jul. 1, 2005 ;24(3):921-9. (Year: 2005).*
International Search Report and Written Opinion for PCT/NZ2021/050027 dated Jun. 9, 2021.

(Continued)

*Primary Examiner* — Chuen-Meei Gan
(74) *Attorney, Agent, or Firm* — Haynes and Boone LLP; Philip H. Albert; William T Hoyer McCarthy

(57) ABSTRACT

A method for generating one or more visual representations of an object colliding with an interface between a simulated fluid and a material. The method includes obtaining shape and movement data of a bulk fluid and an object, identifying an interface where the bulk fluid covers a portion of the object, generating an emitted fluid at the interface, generating shape and movement data of the emitted fluid interacting with the object.

16 Claims, 6 Drawing Sheets

(56) References Cited

OTHER PUBLICATIONS

Wang, H., Mucha, P.J. and Turk, G., 2005. Water drops on surfaces. ACM Transactions on Graphics (TOG), 24(3), pp. 921-929. (Year: 2005).

Stomakhin, A. and Selle, A., 2017. Fluxed animated boundary method. ACM Transactions on Graphics (TOG), 36 (4), pp. 1-8. (Year 2017).

Stomakhin, A., Moffat, A. and Boyle, G., 2019. A practical guide to thin film and drips simulation. In ACM SIGGRAPH 2019 Talks ( pp. 1-2). (Year: 2019).

\* cited by examiner

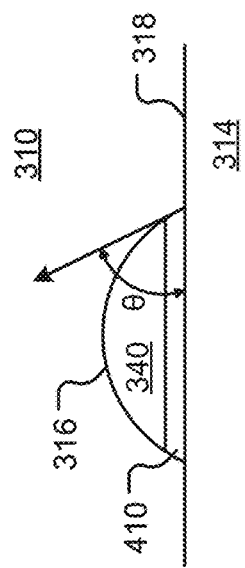
FIG. 4
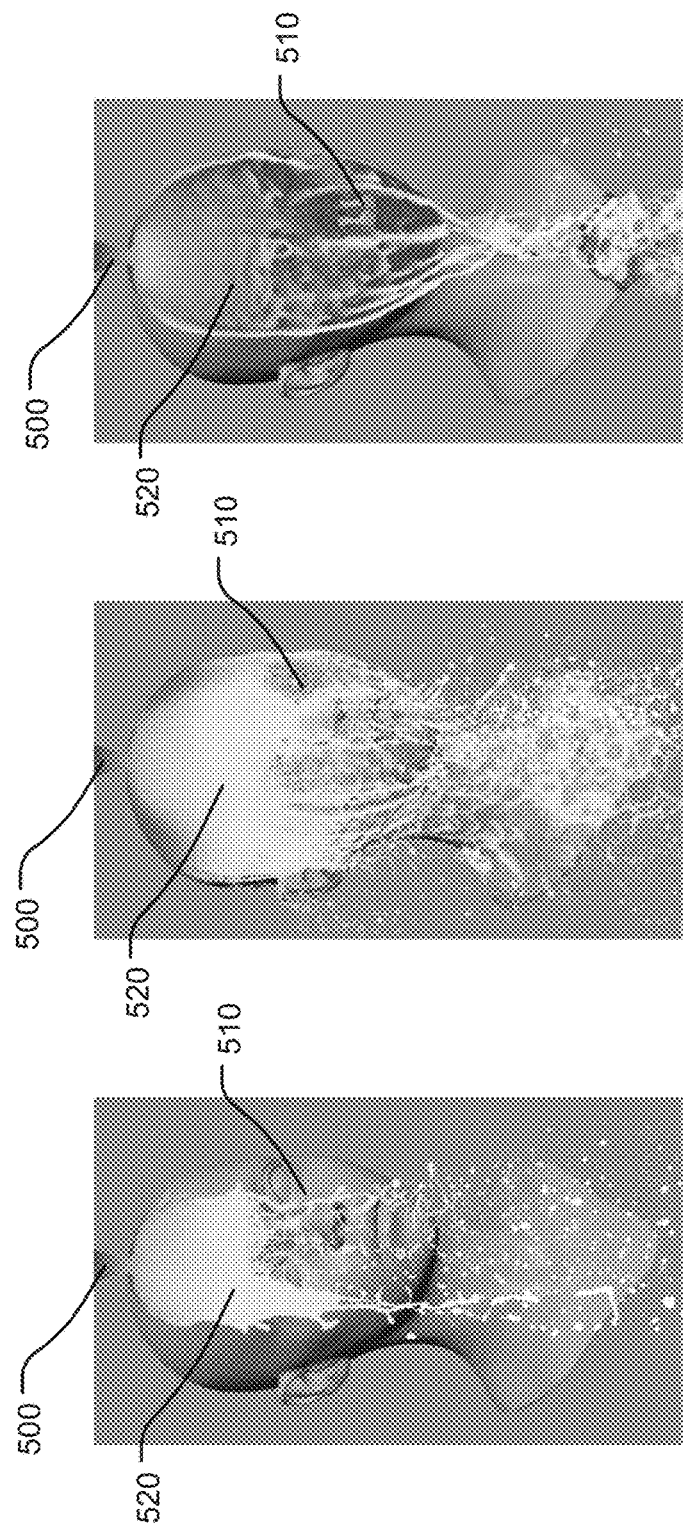
FIG. 5A
FIG. 5B
FIG. 5C

METHOD FOR GENERATING SIMULATIONS OF THIN FILM INTERFACES FOR IMPROVED ANIMATION

CROSS-REFERENCE TO RELATED APPLICATIONS

This application is a continuation of U.S. application Ser. No. 17/184,530, filed on Feb. 24, 2021, and claims the benefit of U.S. Provisional Application No. 63/038,477 filed on Jun. 12, 2020, which is incorporated by reference in its entirety for all purposes.

FIELD OF THE INVENTION

The present disclosure generally relates to methods of generating visual representations of a collision between an object and a fluid and more particularly to generating visual representations of the fluid clinging to and/or dripping from the object during and/or after such a collision.

BACKGROUND

Visual representations of scenes intended to reflect real-world scenarios are common in animation and other fields. For example, a computer-generated imagery scene could be created by having an artist manually draw a sequence of frames to form a video sequence. For simple cartoons, for example, this is a feasible approach. However, as viewers have come to expect more complex visuals, there is a need for computer-driven imagery generation. Some of that computer-driven imagery generation might rely on simulation.

Computer simulation that is used for imagery generation has been used to animate natural phenomena as well as natural movements of characters, such as by using a physics engine to output movements of an articulated character that are consistent with real-world physics and joint constraints. In some ways, this is often a simple problem—how to determine natural-looking movements of at most a few dozen attached body parts. For other simulations, such as those with flexible objects, fluids, and the like, the number of degrees of freedom of individual units is much greater and typically computer simulation requires a trade-off between realism, resolution, and amount of computing resources available.

To enable such trade-offs, efficient computer simulation techniques are needed for an increase in realism and/or resolution without requiring significant increases in computing resources. Therefore, advanced simulation computations involving fluid surface features and other fluid interactions that take into account such trade-offs are urgently needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for generating one or more visual representations of an object colliding with an interface between a simulated fluid and a material under the control of one or more computer systems configured with executable instructions: obtaining shape and movement data of a bulk fluid, obtaining shape and movement data of an object, identifying an interface where the bulk fluid covers a portion of a surface of the object, generating an emitted fluid at the interface, and generating shape and movement data of the emitted fluid interacting with the surface of the object. Other embodiments of this aspect include corresponding computer systems, apparatus, and computer programs recorded on one or more computer storage devices, each configured to perform the actions of the methods.

Implementations may include one or more of the following features. The computer-implemented method further including: obtaining a fluid signed distance field for the bulk fluid; obtaining an object signed distance field for the object; and extrapolating the fluid signed distance field into the object signed distance field such that the bulk fluid covers a portion of the object, the extrapolation including: (a) identifying a fluid value in the fluid signed distance field for each of a plurality of regions within a simulated volume, (b) identifying an object value in the object signed distance field for each of the plurality of regions within the simulated volume, (c) for each region of the plurality of regions within the simulated volume, determining whether a condition is true, for the condition being true when the object value indicates the region is on or in the object and the fluid value indicates that the region is in the simulated fluid, on the simulated fluid, or within a threshold distance of the interface between the simulated fluid and the material, and (d) when the condition is determined to be true, setting the value of the fluid signed distance field equal to a negative of the value of the object signed distance field when the negative of the object value is greater than the fluid value. The computer-implemented method further including: obtaining a map that identifies a portion of the object covered by the simulated fluid. The computer-implemented method further including: obtaining a viscosity value of the bulk fluid; calculating an adjusted viscosity value by multiplying the viscosity value by a viscosity multiplier value before the one or more visual representations are generated; and assigning the adjusted viscosity value to a first portion of the simulated fluid within a threshold distance of the object and assigning the viscosity value to a second portion of the simulated fluid beyond the threshold distance of the object before the one or more visual representations are generated. The computer-implemented method wherein the viscosity multiplier varies with a position on the surface. The computer-implemented method wherein the viscosity multiplier varies with a distance from the surface. The computer-implemented method wherein generating the shape and movement data of the emitted fluid interacting with the surface is based at least in part on a contact angle between the surface and the emitted fluid. The computer-implemented method further including: identifying a boundary along the interface where the object collides with the bulk fluid and the material; and placing a fluid emitter at the boundary, the fluid emitter configured to generate the emitted fluid along at least a portion of the object. The computer-implemented method wherein the fluid emitter is placed by creating the fluid emitter at the boundary by dilating the boundary in a direction relative to a surface of the object. The computer-implemented method wherein the fluid emitter generates a stream of emitted fluid that travels along the surface of the object. A computer system for generating the one or more visual representations of the object colliding with the interface of the simulated fluid, the system including: at least one processor; and a computer-readable medium storing instructions, which when executed by the at least one processor, cause the system to carry out the method. A non-transitory computer-readable storage medium storing instructions, which when executed by at least one processor of a computer system, cause the computer system to carry out the method. A computer-readable medium carrying instructions, which when executed by at least one processor of a computer system, cause the computer system to carry out the method. The computer-implemented method further including generating the one or more visual representations of the object colliding with the interface based at least in part on the shape and movement data of the bulk fluid, the shape and movement data of the object, and the shape and movement data of the emitted fluid. Implementations of the described techniques may include hardware, a method or process, or computer software on a computer-accessible medium.

One general aspect includes a computer-implemented method for generating one or more visual representations of an object colliding with an interface between a simulated fluid and a material under the control of one or more computer systems configured with executable instructions: obtaining an object signed distance field for the object, obtaining a fluid signed distance field for the simulated fluid, obtaining a viscosity value of the simulated fluid, calculating an adjusted viscosity value by multiplying the viscosity value by a viscosity multiplier value, assigning the adjusted viscosity value to a first portion of the simulated fluid within a threshold distance of the object and assigning the viscosity value to a second portion of the simulated fluid beyond the threshold distance of the object, and extrapolating the fluid signed distance field into the object signed distance field such that the simulated fluid covers a portion of the object. Other embodiments of this aspect include corresponding computer systems, apparatus, and computer programs recorded on one or more computer storage devices, each configured to perform the actions of the methods.

Implementations may include one or more of the following features. The computer-implemented method further including: identifying a boundary along the interface where the object collides with the simulated fluid and the material; and placing a fluid emitter at the boundary, the fluid emitter configured to generate a new fluid along at least a portion of the object. The computer-implemented method wherein the object travels in a direction at a predetermined rate, and where the new fluid travels in the direction and at the predetermined rate, and the fluid emitter generates fluid droplets that travel in a second direction opposite from the direction the object travels. The computer-implemented method wherein the fluid emitter is placed by creating the fluid emitter at the boundary by dilating the boundary in a direction relative to a surface of the object. The computer-implemented method wherein the fluid emitter generates a stream of new fluid that travels along the surface of the object. Implementations of the described techniques may include hardware, a method or process, or computer software on a computer-accessible medium.

BRIEF DESCRIPTION OF THE DRAWINGS

Various embodiments in accordance with the present disclosure will be described with reference to the drawings, in which:

FIG. 4 shows emitted fluid on the object.

FIG. 5A shows a computer generated visual representation of water being poured over a character's face in which a fluid SDF was not extrapolated into a solid SDF.

FIG. 5B shows a computer generated visual representation of the water being poured over the character's face in which the fluid SDF was extrapolated into the solid SDF and a contact angle of 45 degrees was used.

FIG. 5C shows a computer generated visual representation of the water being poured over the character's face in which the fluid SDF was extrapolated into the solid SDF and both the contact angle of 45 degrees and a viscosity multiplier of 10 were used.

DETAILED DESCRIPTION

Figure 1:
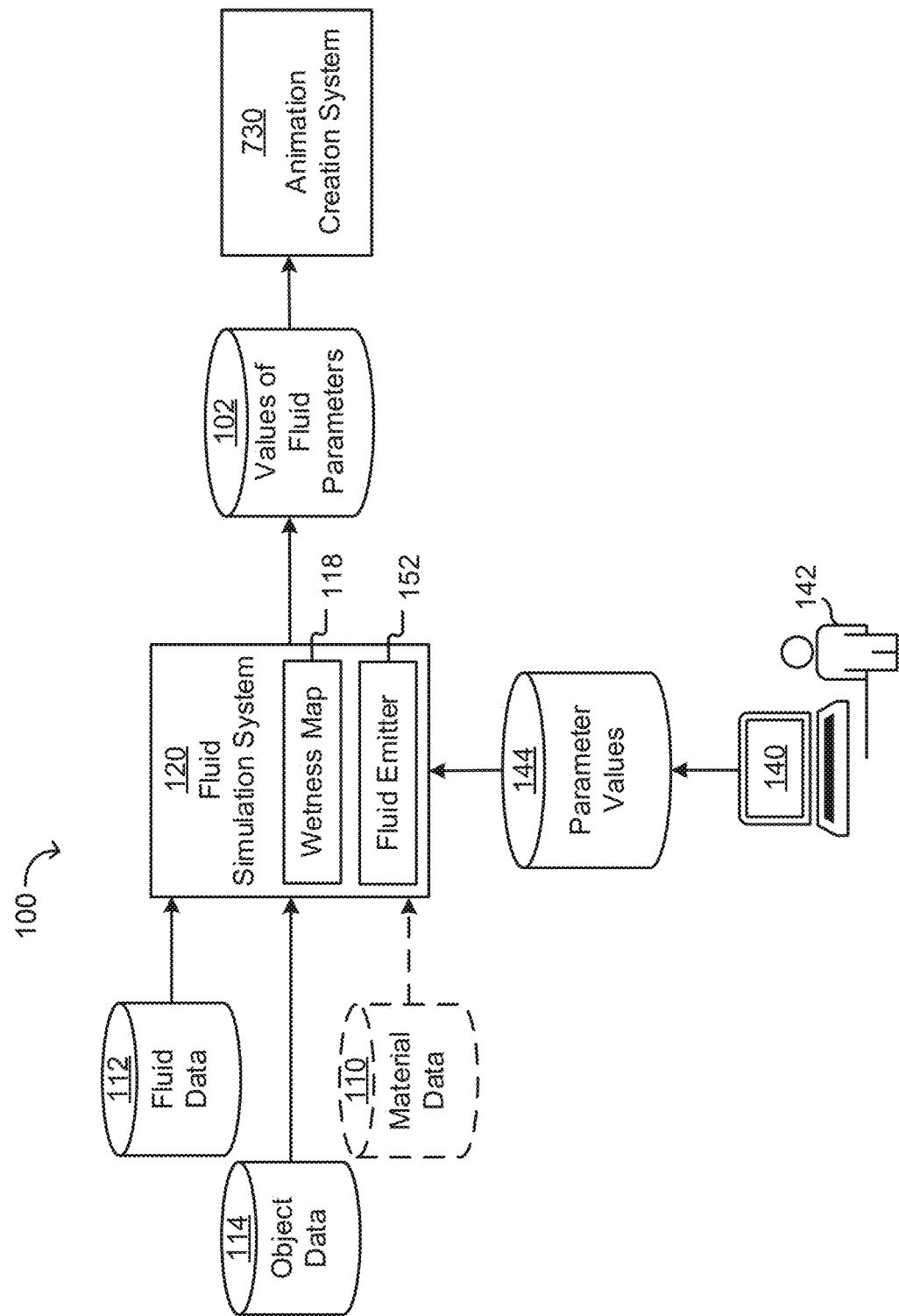
FIG. 1 is a diagram of a data flow through a system when the system is generating values of fluid parameters, which may be used to create visual representations of a collision between an object and a fluid.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

To achieve aforementioned trade-offs between realism, resolution, and required amount of computing resources, advanced simulation computations involving complex fluid surface features or similar dynamic fluid interactions utilize various simulation techniques. For example, to simulate water surface behavior on a sub-centimeter scale, surface tension forces that dominate the dynamics at the small scale can be exploited to obtain, for example, formation of peculiar tendrils, oscillating droplets, and tapering thin films, among other peculiar phenomena. On contact with solid objects, one may observe formation of characteristic fluid channels and capillary wave patterns in that minute scale. In scenario or camera shots where characters go in and out of water close to the camera, capturing those small-scale effects is of utmost importance to sell the performance in otherwise believable environments.

There are a number of simulation techniques in the literature that handle surface tension. Mesh-based approaches, such as those described by F. Da, D. Hahn, C. Batty, C. Wojtan, and E. Grinspun, *Surface-only Liquids*, ACM Trans. Graph. 35, 4, Article 78 (July 2016), B. Zhu, M. Lee, E. Quigley, and R. Fedkiw, *Codimensional non-Newtonian Fluids*, ACM Trans. Graph., 34, 4, Article 115 (July 2015), and B. Zhu, E. Quigley, M. Cong, J. Solomon, and R. Fedkiw, *Codimensional Surface Tension Flow on Simplicial Complexes*, ACM Trans. Graph., 33, 4, Article 111 (July 2014) can capture thin features directly. However, these approaches are challenging from artistic control and pipeline integration standpoints. SPH methods can produce convincing results, such as those presented in N. Akinci, G. Akinci, and M. Teschner, *Versatile Surface Tension and Adhesion for SPH Fluids*, ACM Trans. Graph. 32, 6, Article 182 (November 2013), but scalability is a problem. A major limitation of Eulerian-based techniques is that they are primarily designed for bulk fluid simulation and require high resolution to capture thin features. Even so, good visual results were demonstrated in H. Wang, P. Mucha, and G. Turk, *Water Drops on Surfaces*, ACM Trans. Graph. 24, 3 (July 2005), 921-929. But, Wang et al. uses a particle levelset representation.

In a computer simulation involving three dimensions and having an output that is imagery (such as a still image or a sequence of video frames), often the virtual objects and material being simulated are represented relative to a three-dimensional ("3D") grid in a virtual space with the grid being divided into voxels. Some elements might have sub-voxel resolution.

In many of the examples described herein, inputs to a computer simulation system include parameters about the virtual material/object/fluid/etc. being simulated and an output of a computer simulation are the positions/mass/movement/etc. of the virtual material/object/fluid/etc. Such an output might be an input to an animation system, which can provide for rendering computer-generated imagery of the virtual material/object/fluid/etc. present in a scene in a virtual space. The computer-generated imagery might be still images, stereoscopic images, video sequences, and/or stereoscopic video sequences. In some cases, the computer simulation of virtual elements seeks to match what would happen with corresponding real-world elements, but in other cases, artistic or other inputs are used in the computer simulation to create effects that do not correspond to anything in the real-world, or at least anything in available physical environments. For example, in a given simulation, an operator of a simulation engine might provide an input that corresponds to gravity "turning off" for a short period of time, which can be simulated but has no real-world correspondence.

In the present disclosure, two components of the fluid are treated separately. The "bulk fluid" is an input to the novel process, and may be the output of a simulation (e.g., a low-resolution, non-computationally intensive solution), or may be the product of a procedural fluid generation process, or may for example have been manually created by an artist. The behavior of the bulk fluid describes general movement of the fluid across objects and surfaces. However, the bulk fluid may not be realistic with regard to thin films. In particular, the interaction of thin films with surfaces is dependent on, and sensitive to, fluid-surface interaction parameters such as surface roughness, viscosity, surface tension, and the contact angle between the fluid and the surface, which is a material property of both the fluid and the surface. The "emitted fluid" is a portion of the total fluid which has separated from the bulk fluid and is simulated as a thin film. This novel "emission" process permits the system to simulate the total fluid realistically, while performing detailed thin-film calculations on only a small portion of the total fluid.

The term "implicit surface" is used herein to describe a surface expressed generally by Equation 1 in three-dimensional ("3D") space.

$$F(x,y,x)=0 \qquad \text{(Eqn. 1)}$$

By way of a non-limiting example, an example plane may be expressed as an implicit surface by Equation 2.

$$x+2y-3z+1=0 \qquad \text{(Eqn. 2)}$$

The term "implicit surface volume" is used herein to describe a volume bounded at least in part by an implicit surface. In other words, an inside of the implicit surface faces the implicit surface volume and an outside of the implicit surface faces away from the implicit surface volume.

The term "signed distance" refers to a shortest distance between a point in space and a surface (e.g., an implicit surface). A positive signed distance is on a first side (e.g., the outside) of the surface and a negative signed distance is on a second side (e.g., the inside) of the surface. In some implementations, this might be the opposite.

The term "signed distance field" refers to a data structure storing a plurality of signed distances. Within a signed distance field, the surface (e.g., an implicit surface) is positioned where the signed distances are zero.

The term "contact angle" is a physical parameter representing an amount of adhesion between a specific solid and a specific fluid. If the contact angle is less than 90°, the fluid will wet the solid surface and spread over it. In other words, the fluid is hydrophilic. On the other hand, if the contact angle is greater than or equal to 90°, the fluid will form one or more beads on the solid surface. When this is the case, the fluid is hydrophobic.

Figure 2:
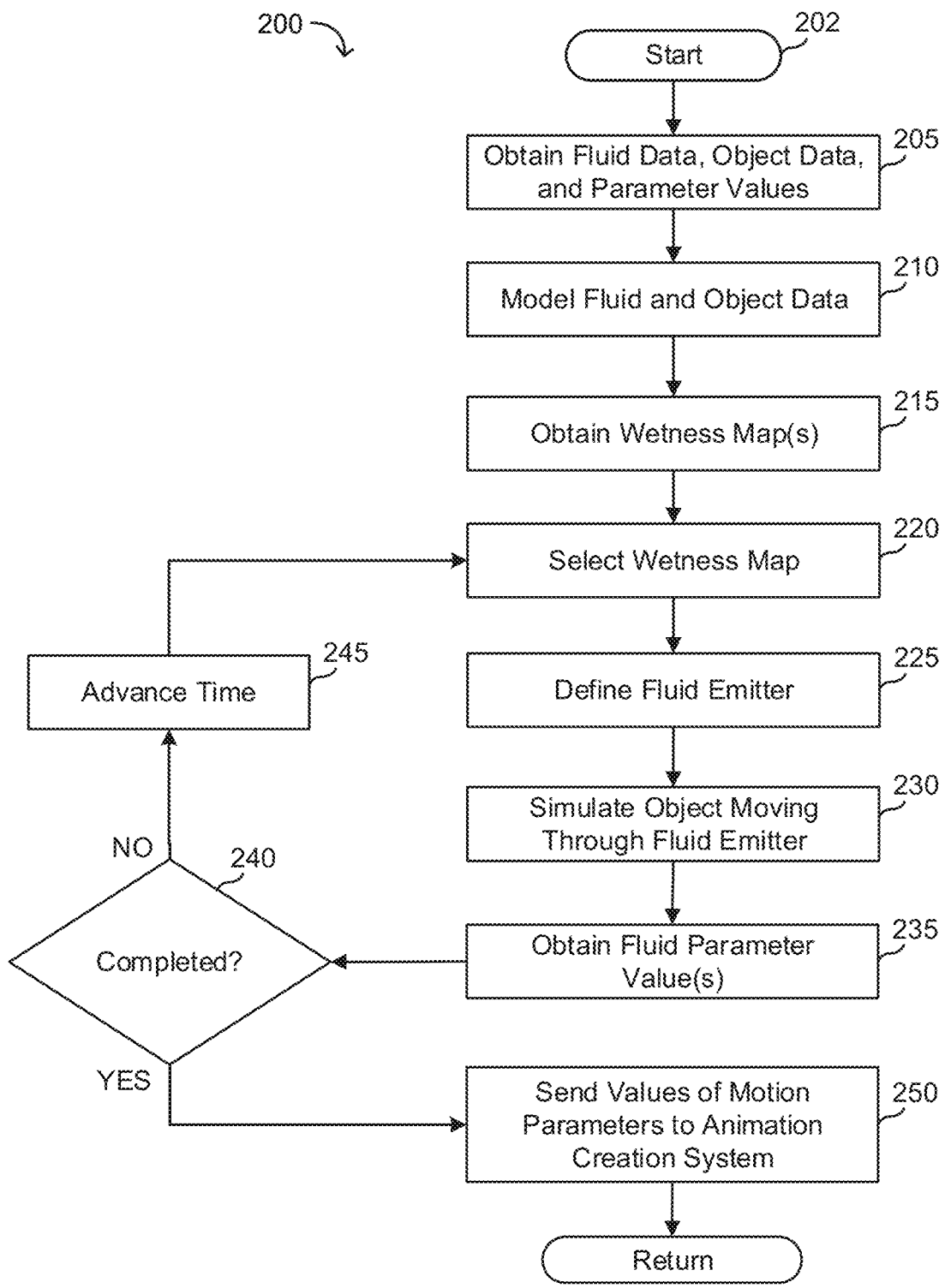
FIG. 2 is a flowchart of the process of generating the values of the fluid parameters.
Figure 3A:
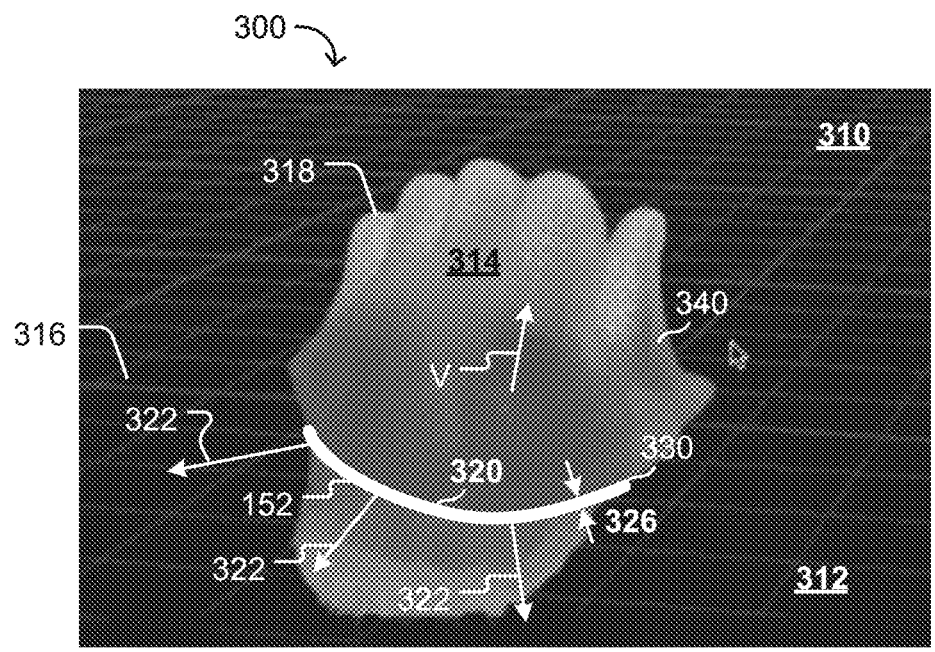
FIG. 3A shows a first visual representation of the object emerging from the fluid at a first time generated from the values of the fluid parameters.
Figure 3B:
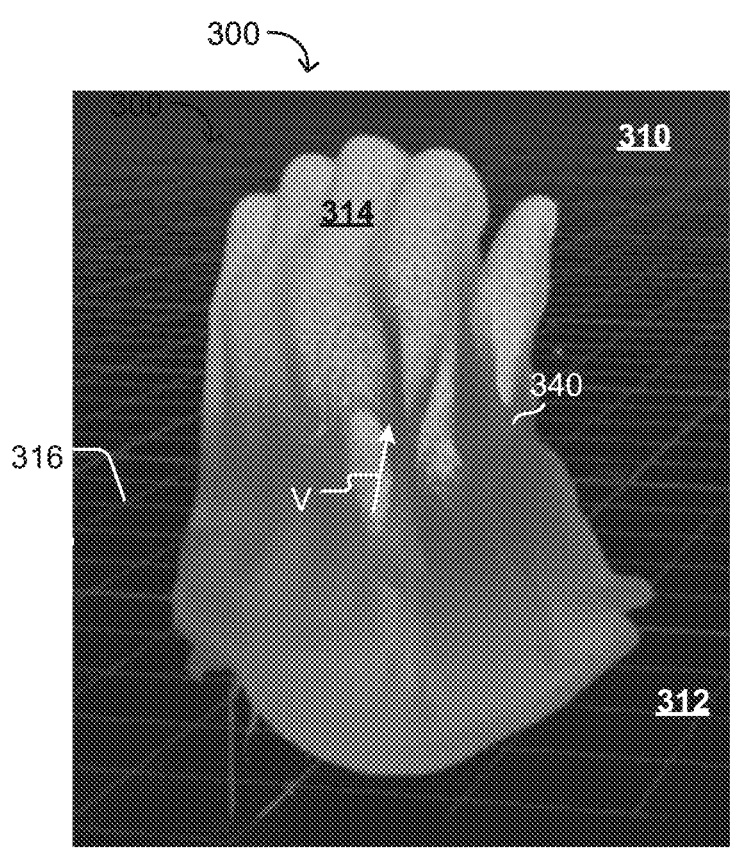
FIG. 3B shows a second visual representation of the object emerging from the fluid at a later second time generated from the values of the fluid parameters.

FIG. 1 is a diagram of a data flow through a system 100 when the system 100 is performing a process 200 (see FIG. 2) that generates values of fluid parameters 102, which are used by an animation creation system 730 component of an example visual content generation system 700 (see FIG. 7) to create visual representations of an object (e.g., an object 314 illustrated in FIGS. 3A-4) colliding with a fluid (e.g., fluid 312 illustrated in FIGS. 3A and 3B) adjacent another material (e.g., material 310 illustrated in FIGS. 3A and 3B). The collision may include at least a portion of the object entering the fluid from the adjacent material or exiting the fluid into the adjacent material. Referring to FIG. 3A, material 310 may be a fluid or a gas. Fluid 312 has an interface 316 with material 310. The interface 316 is generally referred to as being a surface of fluid 312 when material 310 is a gas, such as air. For ease of illustration, material 310 will be described as being air. However, this is not a requirement.

Referring to FIG. 1, the system 100 may be used to simulate one or more objects (e.g., object 314 illustrated in FIGS. 3A-4), defined at least in part by object data 114 depicted stored in a first data storage, colliding with an interface (e.g., the interface 316 illustrated in FIGS. 3A-4) of the fluid (e.g., fluid 312 illustrated in FIGS. 3A-4), defined at least in part by fluid data 112 depicted stored in a second data storage. The material may be defined at least in part by optional material data 110 depicted stored in an optional third data storage. The first, second, and third data storages may be enabled by the same or different storage devices. By way of a non-limiting example, referring to FIG. 3A, material 310 may be air or another gas, object 314 may be an animated character or inanimate object, and fluid 312 may be water or another fluid. When object 314 exits fluid 312 (e.g., the "bulk" fluid) through interface 316 and enters material 310, a thin film of fluid 312 (e.g., the "emitted" fluid) remains on and covers at least a portion of a surface 318 of object 314. Further, some of fluid 312 may drip from the surface 318 of object 314.

Referring to FIG. 1, the system 100 is shown including fluid simulation system 120 and client computing device 140 operated by at least one human artist, as artist 142. Additional computing devices might be included. Fluid simulation system 120 may be implemented by software executing on one or more computer systems (e.g., each like computer system 600 illustrated in FIG. 6). Fluid simulation system 120 is configured to receive optional material data 110 defining the material, fluid data 112 defining the fluid, object data 114 defining the object, and parameter values 144 and output the values of fluid parameters 102. Parameter values 144 may include one or more wetness maps, such as wetness map(s) 118, that fluid simulation system 120 may use to create a fluid emitter 152. Object data 114 and/or parameter values 144 may include one or more object velocities (e.g., stored as one or more vectors). For example, the object velocity/velocities may be stored in a velocity field. Fluid data 112 and/or parameter values 144 may include a fluid viscosity (e.g., a dynamic viscosity), a thickness value, a surface tension coefficient, and the like.

Fluid simulation system 120 may be implemented as a fluid simulator (e.g., a particle-in-cell fluid simulator, a thin film solver, and the like) configured to solve a set of equations for material 310, fluid 312, and object 314 at the same time. Fluid simulation system 120 may be based on a FLIP/APIC fluid simulator configured to implement explicit surface tension handling at a free surface via a ghost fluid method.

The values of fluid parameters 102 may include the optional material data 110, fluid data 112, and/or object data 114. The values of fluid parameters 102 may be generated based at least in part on parameter values 144 that may include parameter values defined by artist 142 (e.g., using the client computing device 140) and/or parameter values that are predetermined and stored in a data store. When parameter values 144 include user-defined parameter values, the simulated collision between the object and the fluid may be characterized as being at least partially art directable. Art directable features might be driven by artist inputs of particular values to result in desirable outputs in resulting computer-graphics output.

As described below, the visual content generation system 700 (see FIG. 7) is configured to receive the values of fluid parameters 102 as input and output one or more static images and/or one or more animated videos. Referring to FIG. 3A, the static image(s) and/or the animated video(s) include one or more visual representations of material 310, fluid 312, and/or object 314. Referring to FIG. 1, the visual content generation system 700 (see FIG. 7) may transmit the static image(s) and/or the animated video(s) to the client computing device 140 for display to artist 142. Artist 142 may use the static image(s) and/or the animated video(s) to view the visual representations of material 310, fluid 312, and/or object 314 and make adjustments to parameter values 144. Then, fluid simulation system 120 may output new values of fluid parameters 102, which the visual content generation system 700 (see FIG. 7) may use to output new versions of the static image(s) and/or the animated video(s) that may be viewed by artist 142 on the client computing device 140. This process may be repeated until artist 142 is satisfied with the appearance of material 310, fluid 312, and/or object 314.

As mentioned above, the client computing device 140 is configured to communicate with fluid simulation system 120. For example, artist 142 may use the client computing device 140 to specify parameter values 144 to fluid simulation system 120. Optionally, fluid simulation system 120 may be configured to display material 310, fluid 312, and/or object 314 to artist 142 on the client computing device 140 so that artist 142 may adjust parameter values 144 as desired before the values of fluid parameters 102 are input into the visual content generation system 700 (see FIG. 7). As mentioned above, the client computing device 140 is configured to receive the static image(s) and/or the animated video(s) from the visual content generation system 700 (see FIG. 5) and display the static image(s) and/or the animated video(s) to artist 142 so that artist 142 may adjust parameter values 144. The client computing device 140 may be implemented using the computer system 600 illustrated in FIG. 6.

Referring to FIG. 3A, fluid 312 may be modeled as a thin film. However, a thin film is typically modeled at a fairly high resolution and simulating the entire fluid 312 at the resolution of a thin film may be impractical (e.g., when object 314 is a character is getting out of a large pool of fluid 312, such as water). Therefore, initially, fluid simulation system 120 (see FIG. 1) models fluid 312 as a bulk fluid that is simulated at relatively lower resolution. Then, fluid simulation system 120 (see FIG. 1) uses a wetness map to create a fluid emitter that drives a high resolution thin film simulation. The thin film simulation may include liquid flow states such as laminar flow, tendril formation, drips, and the like.

FIG. 2 is a flowchart of the process 200 that may be executed by the system 100 of FIG. 1 and used to generate the values of fluid parameters 102 that are used by the visual content generation system 700 (see FIG. 7) to model a collision between object 314 (see FIGS. 3A-4) and fluid 312 (see FIGS. 3A-4). Referring to FIG. 2, upon being initiated at 202, in first block 205, fluid simulation system 120 (see FIG. 1) obtains fluid data 112, object data 114, and parameter values 144. Optionally, fluid simulation system 120 (see FIG. 1) may obtain the optional material data 110 in first block 205. Alternatively, fluid simulation system 120 (see FIG. 1) may assume that material 310 is a default material (e.g., air).

In block 210, fluid simulation system 120 (see FIG. 1) uses fluid data 112, object data 114, and parameter values 144 to model fluid 312 (see FIGS. 3A and 3B) and object 314 (see FIGS. 3A-4). Optionally, fluid simulation system 120 (see FIG. 1) may use the optional material data 110 to model material 310. Fluid 312 may be simulated as a bulk fluid at a relatively lower resolution. Fluid simulation system 120 (see FIG. 1) may obtain a solid signed distance field ("SDF") that maps the distance to object 314 for each region (e.g., voxel) within the simulation. Thus, the system obtains shape and movement data of the bulk fluid, along with shape and movement data of the object.

For ease of illustration, in FIG. 3A, object 314 is moving at a rate and in a direction indicated by a velocity vector "V." However, as mentioned above, the object velocities may be stored in a velocity field. Fluid simulation system 120 (see FIG. 1) may represent fluid 312 (e.g., water) as a plurality of particles (e.g., FLIP or APIC particles), one or more fields on an Eulerian grid, and the like. Fluid simulation system 120 (see FIG. 1) may represent object 314 as a solid (e.g., positioned on the Eulerian grid). Material 310 may be modeled in a manner similar to fluid 312. Alternatively, material 310 may be ignored and not modeled.

In block 215 (see FIG. 2), fluid simulation system 120 (see FIG. 1) obtains the wetness map(s) 118 (see FIG. 1). For example, in block 215, fluid simulation system 120 (see FIG. 1) may use fluid 312 to automatically draw the wetness map(s) 118 (see FIG. 1) on object 314. Alternatively, referring to FIG. 1, artist 142 may manually draw the wetness map(s) 118 on object 314 (see FIGS. 3A-4) using the client computing device 140 (see FIG. 1) and provide wetness map(s) 118 to fluid simulation system 120 (see FIG. 1). By way of a non-limiting example, a different wetness map may be drawn on object 314 (see FIGS. 3A-4) for each frame in an animation. Thus, each of wetness map(s) 118 is painted on object 314 (e.g., in every frame) and identifies which areas of object 314 are wet and which are dry. If object 314 is modeled as a mesh, wetness map(s) 118 may be drawn by specifying each of the vertices as being wet or dry (e.g., by setting values of vertex attributes associated with the vertices). Alternatively, wetness map(s) 118 may be drawn using a volume sampler, a sparse volume, and the like. Each of the wetness map(s) 118 may be implemented as or used to create a fluid SDF in which the value zero corresponds to interface 316 between fluid 312 and material 310.

In block 225 (see FIG. 2), fluid simulation system 120 uses the wetness map(s) 118 and/or the fluid SDF to define fluid emitter 152. To do so, referring to FIG. 3A, fluid simulation system 120 (see FIG. 1) may identify an object-fluid boundary 320 along the interface 316, identify directions 322 normal to object 314 along object-fluid boundary 320, and dilate object-fluid boundary 320 along the directions 322 to a desired emitter thickness 326. The desired emitter thickness 326 may be specified by artist 142 (see FIG. 1) in parameter values 144 (see FIG. 1). Then, fluid simulation system 120 (see FIG. 1) defines fluid emitter 152 as the dilated object-fluid boundary 320. In FIG. 3A, fluid emitter 152 is implemented as a two-dimensional ("2D") ring. But, this is not a requirement. Generally speaking, the greater the desired emitter thickness 326 the more emitted fluid 340 object 314 will appear to drag from fluid 312. But, if the desired emitter thickness 326 is too large, gravity will cause emitted fluid 340 to appear to fall back into fluid 312. The particles representing an emitted fluid 340 may be emitted from an emitter surface 330 of fluid emitter 152.

Fluid simulation system 120 (see FIG. 1) may set the values of one or more conventional fluid emitter properties used to configure fluid emitter 152, such as rate of particle emission, velocity of particles emitted, direction of particles emitted, and the like. Values of at least some of these conventional fluid emitter properties may be provided by artist 142 in parameter values 144. For example, fluid simulation system 120 (see FIG. 1) may configure fluid emitter 152 to emit particles representing emitted fluid 340 at the velocity and in the direction identified by the velocity vector "V," which is the velocity and direction of travel of object 314. Thus, after block 220, fluid emitter 152 (see FIG. 1) is configured to emit the particles representing emitted fluid 340 at a desired rate and in a desired direction with those particles traveling at a desired rate of travel. If the velocity vector "V" points toward a dry region of object 314, the particles representing emitted fluid 340 are emitted in that direction. In the example illustrated in FIG. 3A, emitter surface 330 may emit the particles representing emitted fluid 340 vertically upwards. In the example illustrated, the velocity vector "V" specifies a flux of the particles representing emitted fluid 340 through emitter surface 330. Fluid emitter 152 (see FIG. 1) may be implemented as a fluxed animated boundary ("FAB") emitter. The FAB emitter may have a material velocity property that may be set equal to the velocity vector "V."

Fluid simulation system 120 (see FIG. 1) may set the values of one or more conventional fluid parameters that configure the particles representing emitted fluid 340. For example, fluid simulation system 120 (see FIG. 1) may specify a dynamic viscosity of fluid 340 (e.g., $10^{-3}$ Pa*s), a surface tension coefficient (e.g., 0.072 N/m), and the like. The values used by fluid simulation system 120 (see FIG. 1) may be included in parameter values 144 (see FIG. 1).

In block 230 (see FIG. 2), fluid simulation system 120 (see FIG. 1) simulates object 314 colliding with (e.g., traveling through) the interface 316. In the example illustrated in FIGS. 3A and 3B, object 314 moves outwardly from fluid 312 into material 310. Turning to FIG. 3A, this is simulated by moving object 314 with respect to emitter surface 330 as emitter surface 330 emits emitted fluid 340 (e.g., as particles). This simulation may be performed using a standard variational FLIP solver, a thin film solver, a particle-in-cell fluid simulator, and the like. For example, material 310, fluid 312, object 314, and fluid emitter 152 may be fed into to a particle-in-cell fluid simulator configured to implement high quality emission by fluid emitter 152 (see FIG. 1), which pumps emitted fluid 340 (e.g., as particles) into the simulation. Thus, shape and movement data for the emitted fluid 340 is generated.

Emitter surface 330 may emit emitted fluid 340 (e.g., as particles) at the velocity and in the direction identified by the velocity vector "V." As this occurs, it may be desirable for at least some of emitted fluid 340 (e.g., particles) to stick to object 314, at least temporarily, as object 314 appears to move through emitter surface 330. For example, at least a portion of emitted fluid 340 may stick to object 314 as a thin film. Thus, object 314 may appear to pull emitted fluid 340 from fluid 312 as object 314 moves across interface 316.

As mentioned above, fluid simulation system 120 (see FIG. 1) may obtain (e.g., create) the solid SDF for object 314. The solid SDF includes a distance from the surface 318 at each location (e.g., voxel) being simulated. Locations assigned distances with positive values are outside object 314 and locations assigned distances with negative values are inside object 314. Locations along the surface 318 are assigned a distance of zero.

As mentioned above, the wetness map(s) 118 may include a different map for each frame of an animation. Further, the each of the wetness map(s) 118 may be implemented as a fluid SDF in which the value zero corresponds to the interface 316 (or surface of fluid 312). Thus, fluid simulation system 120 (see FIG. 1) may select an appropriate fluid SDF for the current frame.

Referring to FIG. 4, the fluid SDF is reconstructed from the emitted (FLIP) particles on each simulation step, and consequently may exhibit poor temporal coherence and contact with the surface 318. To ensure emitted fluid 340 contacts the surface 318, the fluid SDF may be extrapolated into the solid SDF before the mean curvature is calculated at a contact angle "θ." In other words, this extrapolation makes emitted fluid 340 stick to the surface 318 of object 314. For example, FIG. 5A shows a computer generated visual representation of water 500 being poured over a character's face 510 in which the fluid SDF was not extrapolated into the solid SDF. As explained above, in FIG. 5A, the water 500 may be modeled initially as a bulk fluid and a fluid emitter (like emitter surface 330) may emit emitted water 520 over the character's face 510.

Referring to FIG. 1, fluid simulation system 120 may perform a procedure "Extrapolate" for each specific region (e.g., voxel). The procedure "Extrapolate" extrapolates the fluid SDF into the solid SDF. An example implementation of the procedure "Extrapolate" is provided by pseudocode below. The procedure "Extrapolate" may receive values of variables "fluidSDF" and "solidSDF" as inputs. The variable "fluidSDF" may be a pointer to a float type value and the variable "solidSDF" may be implemented as a float type variable. The variable "fluidSDF" may point to the value of the fluid SDF for the specific region (e.g., a voxel) of emitted fluid 340. The variable "solidSDF" may be equal to the value of the solid SDF for a specific region (e.g., a voxel) of object 314.

The procedure "Extrapolate" begins by checking a first condition. Referring to FIG. 3A, the first condition is "TRUE," when the value of the variable "solidSDF" is less than or equal to zero (which means the voxel is at the surface of object 314 or inside object 314) and the value pointed to by the variable "fluidSDF" is less than a threshold amount (which means the voxel is inside fluid 312, on fluid 312, or outside fluid 312 by at most the threshold amount). Otherwise, the first condition is "FALSE." Thus, the first condition checks to make sure the specific region is on or inside the object and within the threshold amount of the interface 316.

When the first condition is "FALSE," the procedure "Extrapolate" terminates. On the other hand, when the first condition is "TRUE," the procedure "Extrapolate" checks a second condition. The second condition is "TRUE," when a negative of the value of the variable "solidSDF" is greater than or equal to the value pointed to by the variable "fluidSDF." Otherwise, the second condition is "FALSE." If the specific region satisfied the first condition, the value of the variable "solidSDF" is negative so the negative of the value of the variable "solidSDF" is a positive value. Also, if the specific region satisfied the first condition, the largest possible value pointed to by the variable "fluidSDF" is the threshold amount. By way of a non-limiting example, in the pseudocode, the threshold amount is four times the size of a voxel.

If the second condition is "TRUE," fluid simulation system 120 (see FIG. 1) sets the value of the fluid SDF pointed to by the variable "fluidSDF" equal to the negative of the value of the variable "solidSDF."

Then, when the second condition is "TRUE" or "FALSE" and the first condition is "TRUE," fluid simulation system 120 (see FIG. 1) calculates a distance (e.g., stored in a variable "d") between the value pointed to by the variable "fluidSDF" and the value of the variable "solidSDF." For example, the distance may be calculated by obtaining the square root of a difference between the value pointed to by the variable "fluidSDF" squared and the value of the variable "solidSDF" squared. Next, a new value is calculated for the value pointed to by the variable "fluidSDF." The new value may be a sum of the distance multiplied by the sine of the contact angle "θ" and the value of the variable "solidSDF" multiplied by the cosine of the contact angle "θ." Then, the procedure "Extrapolate" terminates.

The extrapolation may work for contact angles ranging from 0° to 90°, which are sufficient for applications requiring strong adhesion. For example, FIG. 5B illustrates a computer generated visual representation of the water 500 being poured over the character's face 510 in which a contact angle of 45 degrees was used. As explained above, in FIG. 5B, the water 500 may be modeled initially as a bulk fluid and a fluid emitter (like emitter surface 330) may emit emitted water 520 over the character's face 510. Referring to FIG. 1, artist 142 may specify the contact angle "θ" in parameter values 144. By way of another non-limiting example, artist 142 may identify a particular fluid that is associated by fluid simulation system 120 (see FIG. 1) with a corresponding contact angle. The contact angle might be any sensible value, and depending on artist interests, it need not be constrained by what is physically possible.

While the extrapolation may be performed for all of the simulation grid voxels, it may suffice to extrapolate only a predetermined number of voxels (e.g., four) deep into object 314 (as indicted by the solid SDF). Additionally, the result may be improved by using redistancing and Gaussian smoothing near the surface 318 of object 314.

Without careful handling of moving collision objects, emitted fluid 340 may gradually separate from object 314 and collapse due to surface tension, giving object 314 an undesirably hydrophobic look. This may be corrected by ensuring that a velocity field enforces boundary conditions in the pressure and viscosity solves, and hence advects fluid (e.g., fluid 340) at object-fluid boundary 320, corresponds exactly to the motion of object 314. Thus, after advection, emitted fluid 340 and object 314 are in sync.

One method of achieving this is to treat the motion of the object(s) as piecewise linear from step to step (or frame-to-frame if sub-frame data is unavailable) and use forward differencing to calculate the velocity for the boundary conditions.

Fluid simulation system 120 (see FIG. 1) treats surface tension explicitly via an inhomogeneous boundary condition in the pressure projection step. The boundary condition is equal to mean curvature of the fluid SDF multiplied by the surface tension coefficient (e.g., 0.072 N/m). Equation 1 below is Laplace's Law, which calculates a pressure difference (represented by an expression "$\nabla P_{surf}$") across the fluid's surface. In Equation 1, a variable "γ" represents a surface tension coefficient (e.g., 0.072 N/m) for interface 316, which might be a fluid-air interface, and a variable "κ" represents the surface mean curvature.

$$\nabla P_{surf} = \gamma \cdot \kappa \qquad \text{(Eqn. 1)}$$

As mentioned above, the surface mean curvature (represented by the variable "κ") can be calculated using the fluid SDF.

The viscosity solve may include a viscosity multiplier that accounts for surface roughness. The viscosity multiplier may be specified as an input by artist 142 (e.g., as one of parameter values 144). Emitted fluid 340 interacts with rough surfaces and surfaces with tiny features (such as pores and peach fuzz on skin) differently than emitted fluid 340 interacts with smooth surfaces (such as porcelain surfaces). However, tiny surface features are typically too small to be captured by the simulation grid. Because such tiny surface features have a macroscopic friction effect, emitted fluid 340 does not slide off as readily. Thus, surfaces that include such surface features may be sticky with respect to emitted fluid 340. Therefore, the viscosity multiplier may determine how much of emitted fluid 340 sticks to object 314. Referring to FIG. 4, fluid simulation system 120 (see FIG. 1) models the effect by multiplying the viscosity by the viscosity multiplier to thereby increase the viscosity in a thin band 410 around object 314 (e.g., a one millimeter band). This also may result in a more stable flow structure and may yield capillary wave patterns, as shown in FIG. 5C. FIG. 5C illustrates a computer generated visual representation of the water 500 being poured over the character's face 510 in which the contact angle is 45 degrees and a viscosity multiplier of 10 is used in a one voxel band near or along the collision. As explained above, the water 500 may be modeled initially as a bulk fluid and a fluid emitter (like emitter surface 330) may emit emitted water 520 over the character's face 510. In FIGS. 5A-5C, a simulation voxel size of 0.4 millimeters was used. The viscosity adjustments may be made spatially varying to represent surfaces with varying roughness. In other words, more than one viscosity multiplier may be provided by artist 142 (e.g., as one of parameter values 144) and assigned to different regions along the surface 318 of object 314.

The dynamic viscosity may play an important dampening role at a millimeter scale, so fluid simulation system 120 (see FIG. 1) may implement a variational approach for dealing with dynamic viscosity. APIC transfer may be added to improve the overall accuracy and stability of the simulation.

In block 235 (see FIG. 2), fluid simulation system 120 (see FIG. 1) obtains the values of fluid parameters 102, which may for example include shape and movement parameters of the emitted fluid 340.

In decision block 240, fluid simulation system 120 determines whether the simulation has completed. The decision in decision block 240 is "YES," when fluid simulation system 120 determines the simulation has completed. Otherwise, the decision in decision block 240 is "NO." By way of a non-limiting example, blocks 220-245 may be repeated a desired number of iterations (e.g., five times). The number of iterations might be specified by an artist (e.g., artist 142) or operator in advance. For example, blocks 220-235 may be repeated a number of times required to generate the values of fluid parameters 102 needed to create a desired number of frames.

When the decision in decision block 240 is "NO," fluid simulation system 120 advances to block 245 whereat fluid simulation system 120 advances the simulation in time (e.g., to the next frame). Then, fluid simulation system 120 returns to block 220 and selects the wetness map for the new time (e.g., for the next frame in the animation).

When the decision in decision block 240 is "YES," in block 250 (see FIG. 2), fluid simulation system 120 forwards the values of fluid parameters 102 to the animation creation system 730 (see FIGS. 1 and 7) component of the visual content generation system 700 (see FIG. 7), which uses the values of fluid parameters 102 to create one or more visual representations of fluid 312 and/or object 314. Then, the process 200 terminates.

Pseudocode for Extrapolation Corresponding to Contact Angle θ:

```
procedure Extrapolate(float& fluidSDF, float solidSDF)
    if solidSDF ≤ 0 and fluidSDF < 4 * voxelSize then
        if -solidSDF > fluidSDF then fluidSDF ← -solidSDF
        d ← sqrt(fluidSDF² - solidSDF²)
        fluidSDF ← sinθ * d + cosθ * solidSDF
```

The pseudocode might be executed by an animation creation system using parameters specified by an artist or obtain in another way.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 6:
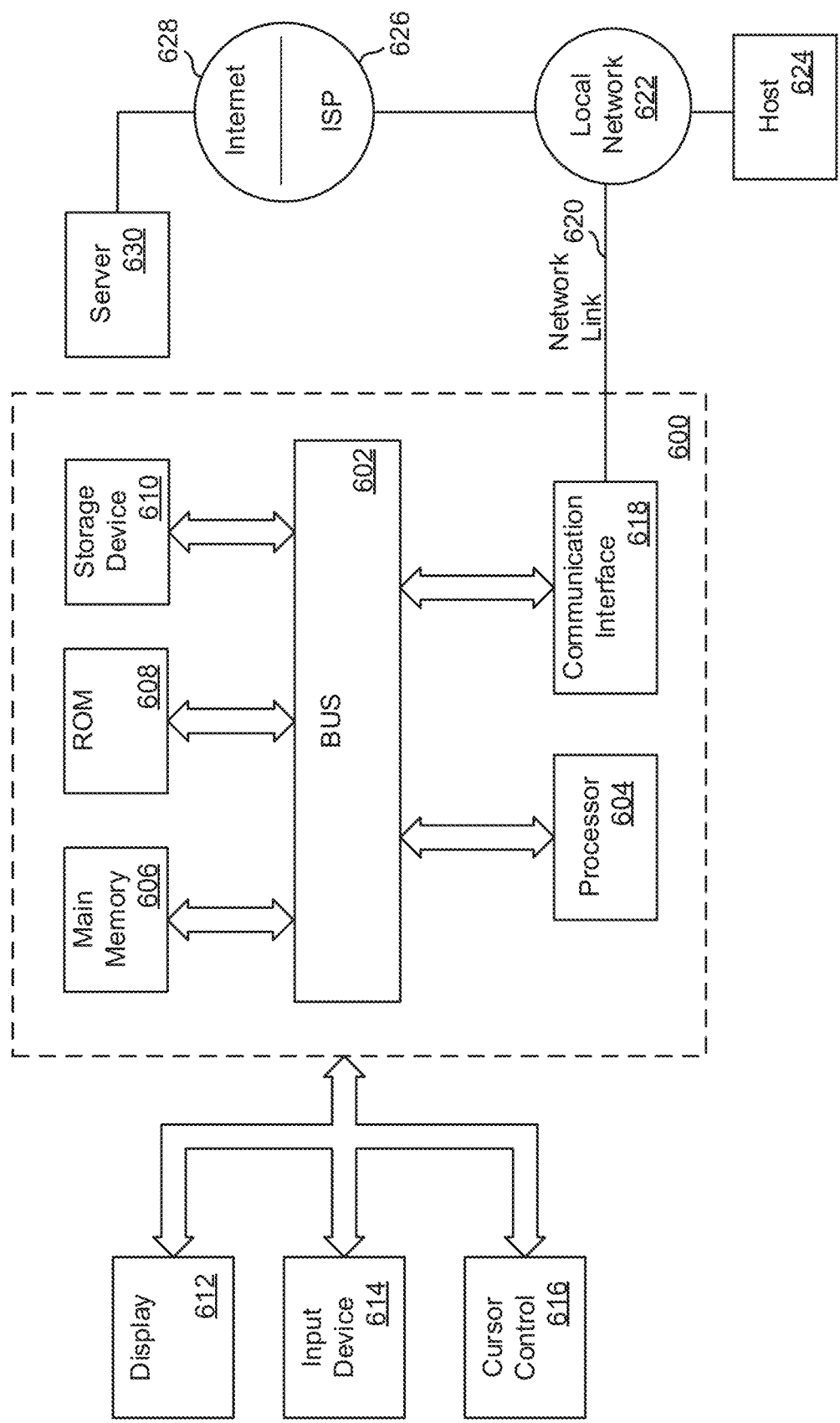
FIG. 6 is a block diagram illustrating an example computer system upon which computer systems of the systems illustrated in FIGS. 1 and 7 may be implemented.

For example, FIG. 6 is a block diagram that illustrates a computer system 600 upon which the computer systems of the system 100 (see FIG. 1) and/or the visual content generation system 700 (see FIG. 7) may be implemented. The computer system 600 includes a bus 602 or other communication mechanism for communicating information, and a processor 604 coupled with the bus 602 for processing information. The processor 604 may be, for example, a general purpose microprocessor.

The computer system 600 also includes a main memory 606, such as a random access memory (RAM) or other dynamic storage device, coupled to the bus 602 for storing information and instructions to be executed by the processor 604. The main memory 606 may also be used for storing temporary variables or other intermediate information during execution of instructions to be executed by the processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a computer monitor, for displaying information to a computer user. An input device 614, including alphanumeric and other keys, is coupled to the bus 602 for communicating information and command selections to the processor 604. Another type of user input device is a cursor control 616, such as a mouse, a trackball, or cursor direction keys for communicating direction information and command selections to the processor 604 and for controlling cursor movement on the display 612. This input device typically has two degrees of freedom in two axes, a first axis (e.g., x) and a second axis (e.g., y), that allows the device to specify positions in a plane.

The computer system 600 may implement the techniques described herein using customized hard-wired logic, one or more ASICs or FPGAs, firmware and/or program logic which in combination with the computer system causes or programs the computer system 600 to be a special-purpose machine. According to one embodiment, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 610. Volatile media includes dynamic memory, such as the main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid state drive of a remote computer. The remote computer can load the instructions into its dynamic memory and send the instructions over a network connection. A modem or network interface local to the computer system 600 can receive the data. The bus 602 carries the data to the main memory 606, from which the processor 604 retrieves and executes the instructions. The instructions received by the main memory 606 may optionally be stored on the storage device 610 either before or after execution by the processor 604.

The computer system 600 also includes a communication interface 618 coupled to the bus 602. The communication interface 618 provides a two-way data communication coupling to a network link 620 that is connected to a local network 622. For example, the communication interface 618 may be an integrated services digital network (ISDN) card, cable modem, satellite modem, or a modem to provide a data communication connection to a corresponding type of telephone line. Wireless links may also be implemented. In any such implementation, the communication interface 618 sends and receives electrical, electromagnetic, or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP) 626. The ISP 626 in turn provides data communication services through the world wide packet data communication network now commonly referred to as the "Internet" 628. The local network 622 and Internet 628 both use electrical, electromagnetic, or optical signals that carry digital data streams. The signals through the various networks and the signals on the network link 620 and through the communication interface 618, which carry the digital data to and from the computer system 600, are example forms of transmission media.

The computer system 600 can send messages and receive data, including program code, through the network(s), the network link 620, and communication interface 618. In the Internet example, a server 630 might transmit a requested code for an application program through the Internet 628, ISP 626, local network 622, and communication interface 618. The received code may be executed by the processor 604 as it is received, and/or stored in the storage device 610, or other non-volatile storage for later execution.

Figure 7:
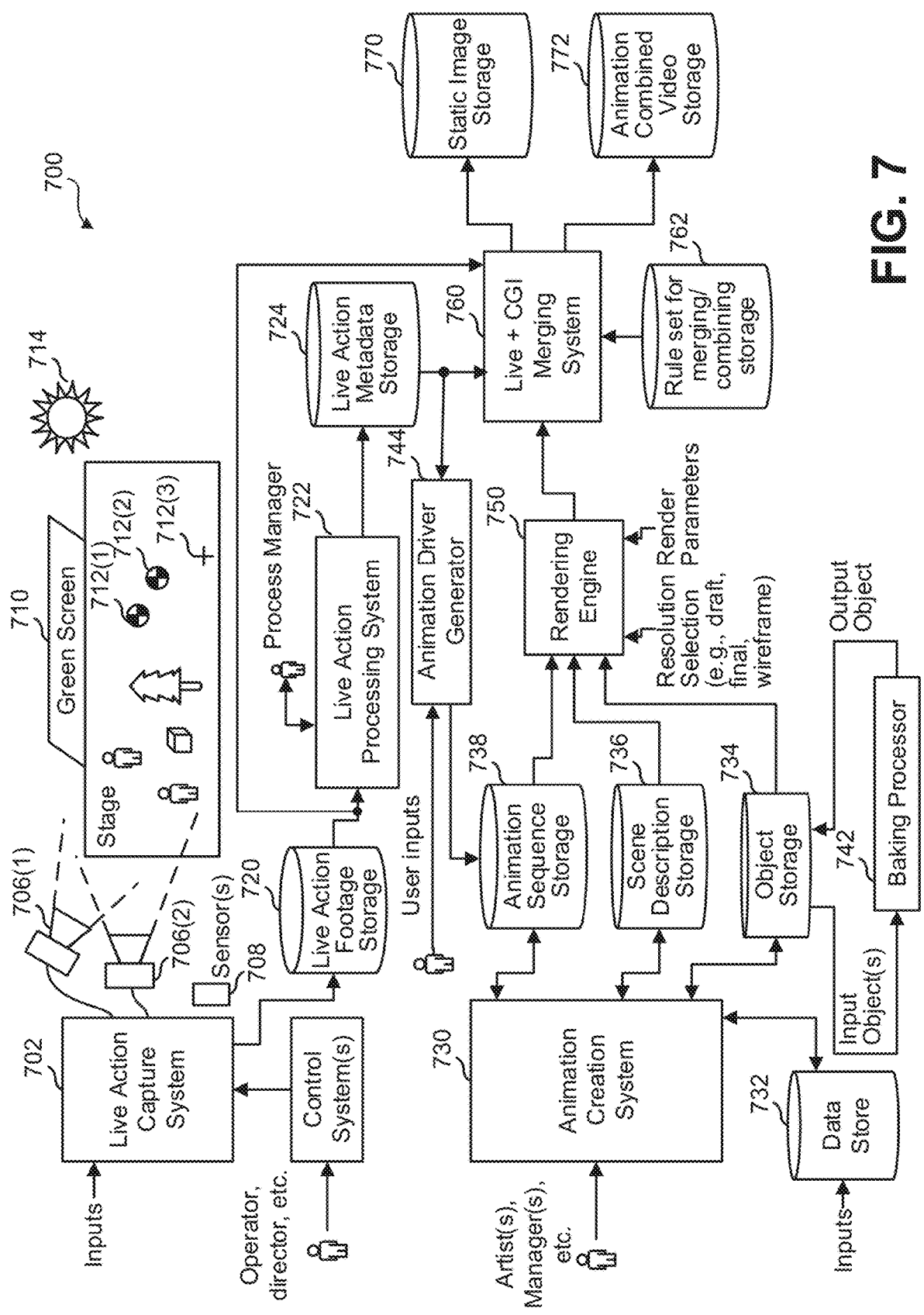
FIG. 7 illustrates an example visual content generation system as might be used to generate imagery in the form of still images and/or video sequences of images.

For example, FIG. 7 illustrates the example visual content generation system 700 as might be used to generate imagery in the form of still images and/or video sequences of images. The visual content generation system 700 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 142 illustrated in FIG. 1) and might use the visual content generation system 700 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 142 illustrated in FIG. 1) might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 7, a live action capture system 702 captures a live scene that plays out on a stage 704. The live action capture system 702 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 706(1) and 706(2) capture the scene, while in some systems, there might be other sensor(s) 708 that capture information from the live scene (e.g., infrared cameras, infrared sensors, motion capture ("mo-cap") detectors, etc.). On the stage 704, there might be human actors, animal actors, inanimate objects, background objects, and possibly an object such as a green screen 710 that is designed to be captured in a live scene recording in such a way that it is easily overlaid with computer-generated imagery. The stage 704 might also contain objects that serve as fiducials, such as fiducials 712(1)-(3), that might be used post-capture to determine where an object was during capture. A live action scene might be illuminated by one or more lights, such as an overhead light 714.

During or following the capture of a live action scene, the live action capture system 702 might output live action footage to a live action footage storage 720. A live action processing system 722 might process live action footage to generate data about that live action footage and store that data into a live action metadata storage 724. The live action processing system 722 might include computer processing capabilities, image processing capabilities, one or more processors, program code storage for storing program instructions executable by the one or more processors, as well as user input devices and user output devices, not all of which are shown. The live action processing system 722 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 714, as that might be useful in post-processing to match computer-generated lighting on objects that are computer-generated and overlaid on the live action footage.

The live action processing system 722 might operate autonomously, perhaps based on predetermined program instructions, to generate and output the live action metadata upon receiving and inputting the live action footage. The live action footage can be camera-captured data as well as data from other sensors.

An animation creation system 730 is another part of the visual content generation system 700. The animation creation system 730 might include computer processing capabilities, image processing capabilities, one or more processors, program code storage for storing program instructions executable by the one or more processors, as well as user input devices and user output devices, not all of which are shown. The animation creation system 730 might be used by animation artists, managers, and others to specify details, perhaps programmatically and/or interactively, of imagery to be generated. From user input and data from a database or other data source, indicated as a data store 732, the animation creation system 730 might generate and output data representing objects (e.g., a horse, a human, a ball, a teapot, a cloud, a light source, a texture, etc.) to an object storage 734, generate and output data representing a scene into a scene description storage 736, and/or generate and output data representing animation sequences to an animation sequence storage 738.

Scene data might indicate locations of objects and other visual elements, values of their parameters, lighting, camera location, camera view plane, and other details that a rendering engine 750 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 730 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to object storage 734 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 732 might be used to drive object presentation. For example, if an artist is creating an animation of a spaceship passing over the surface of the Earth, instead of manually drawing or specifying a coastline, artist 142 might specify that the animation creation system 730 is to read data from the data store 732 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 744 might read in live action metadata, such as data representing movements and positions of body parts of a live actor during a live action scene, and generate corresponding animation parameters to be stored in the animation sequence storage 738 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 722. The animation driver generator 744 might convert that movement data into specifications of how joints of an articulated CGI character are to move over time.

A rendering engine 750 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 750 might include computer processing capabilities, image processing capabilities, one or more processors, program code storage for storing program instructions executable by the one or more processors, as well as user input devices and user output devices, not all of which are shown.

The visual content generation system 700 can also include a merging system 760 that merges live footage with animated content. The live footage might be obtained and input by reading from the live action footage storage 720 to obtain live action footage, by reading from the live action metadata storage 724 to obtain details such as presumed segmentation in captured images segmenting objects in a live action scene from their background (perhaps aided by the fact that the green screen 710 was part of the live action scene), and by obtaining CGI imagery from the rendering engine 750.

A merging system 760 might also read data from a rulesets for merging/combining storage 762. A very simple example of a rule in a ruleset might be "obtain a full image including a two-dimensional pixel array from live footage, obtain a full image including a two-dimensional pixel array from the rendering engine 750, and output an image where each pixel is a corresponding pixel from the rendering engine 750 when the corresponding pixel in the live footage is a specific color of green, otherwise output a pixel value from the corresponding pixel in the live footage."

The merging system 760 might include computer processing capabilities, image processing capabilities, one or more processors, program code storage for storing program instructions executable by the one or more processors, as well as user input devices and user output devices, not all of which are shown. The merging system 760 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 760, such as modifying boundaries of segmented objects, inserting blurs to smooth out imperfections, or adding other effects. Based on its inputs, the merging system 760 can output an image to be stored in a static image storage 770 and/or a sequence of images in the form of video to be stored in an animated/combined video storage 772.

Thus, as described, the visual content generation system 700 can be used to generate video that combines live action with computer-generated animation using various components and tools, some of which are described in more detail herein. While the visual content generation system 700 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory.

A computer-readable medium can include a computer-readable storage medium and a transmission medium.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A system for generating one or more visual representations of an object colliding with an interface between a simulated fluid and a material, the system comprising:
    a computer-readable medium storing instructions, which when executed by at least one processor, cause the system to:
    obtain a fluid signed distance field for the simulated fluid;
    obtain an object signed distance field for the object;
    obtain a viscosity value of the simulated fluid;
    calculate an adjusted viscosity value by multiplying the viscosity value by a viscosity multiplier value;
    assign the adjusted viscosity value to a first portion of the simulated fluid within a threshold distance of the object;
    assign the viscosity value to a second portion of the simulated fluid beyond the threshold distance of the object;
    extrapolate the fluid signed distance field into the object signed distance field such that the simulated fluid covers a portion of the object;
    generate the one or more visual representations of the object colliding with the interface based at least in part on the fluid signed distance field; and
    render the one or more visual representations of movement of the object colliding with the interface based on at least in part on the fluid signed distance field.

2. The system of claim 1, wherein the instructions, when executed by the at least one processor, further cause the system to:
    obtain a contact angle between the simulated fluid and the object; and
    extrapolate, for each region of a plurality of regions that a simulation comprises, the fluid signed distance field into the object signed distance field, the extrapolation comprising:
    (a) identifying a fluid value in the fluid signed distance field for each of the plurality of regions,
    (b) identifying an object value in the object signed distance field for each of the plurality of regions,
    (c) for each of the plurality of regions, determining whether a condition is true, wherein the condition is true when the object value indicates the region is on or in the object and the fluid value indicates that the region is in the simulated fluid, on the simulated fluid, or within a threshold distance of the interface between the simulated fluid and the material, and
    (d) when the condition is determined to be true, (i) setting the fluid value equal to a negative of the object value when the negative of the object value is greater than the fluid value, (ii) determining a distance between the fluid value and the object value, and (iii) setting the fluid value equal to a sum of the distance multiplied by a sine of the contact angle and the object value multiplied by a cosine of the contact angle.

3. The system of claim 1, wherein the instructions, when executed by the at least one processor, further cause the system to:
    obtain a map that identifies a portion of the object covered by the simulated fluid.

4. The system of claim 1, wherein the material is invisible, and the simulated fluid is visible.

5. The system of claim 1, wherein the material is visible, and the simulated fluid is invisible.

6. The system of claim 1, wherein the material is air or a gaseous material.

7. The system of claim 1, wherein the instructions, when executed by the at least one processor, further cause the system to:
    identify a boundary along the interface where the object collides with the simulated fluid and the material; and
    place a fluid emitter at the boundary, the fluid emitter configured to generate a new fluid along at least a portion of the object.

8. The system of claim 7, wherein the object travels in a direction at a predetermined rate, and the new fluid travels in the direction and at the predetermined rate.

9. The system of claim 7, wherein the object travels in a direction at a predetermined rate, and the fluid emitter generates fluid droplets that travel in a second direction opposite from the direction the object travels.

10. The system of claim 7, wherein the fluid emitter is placed by creating the fluid emitter at the boundary by dilating the boundary in a direction normal to a surface of the object.

11. The system of claim 10, wherein the fluid emitter generates a stream of new fluid that travels along the surface of the object.

12. A system for generating one or more visual representations of an object colliding with an interface between a simulated fluid and a material, the system comprising:
    a computer-readable medium storing instructions, which when executed by at least one processor, cause the system to:
    obtain an object signed distance field for the object;

obtain a fluid signed distance field for the simulated fluid;

obtain a viscosity value of the simulated fluid;

calculate an adjusted viscosity value by multiplying the viscosity value by a viscosity multiplier value;

assign the adjusted viscosity value to a first portion of the simulated fluid within a threshold distance of the object;

assign the viscosity value to a second portion of the simulated fluid beyond the threshold distance of the object;

extrapolate the fluid signed distance field into the object signed distance field such that the simulated fluid covers a portion of the object;

generate the one or more visual representations of the object colliding with the interface based at least in part on the fluid signed distance field; and render the one or more visual representations of movement of the object colliding with the interface based on at least in part on the fluid signed distance field.

13. The system of claim 12, wherein the instructions, when executed by the at least one processor, further cause the system to:

identify a boundary along the interface where the object collides with the simulated fluid and the material; and place a fluid emitter at the boundary, the fluid emitter configured to generate a new fluid along at least a portion of the object.

14. The system of claim 13, wherein the object travels in a direction at a predetermined rate, and wherein the new fluid travels in the direction and at the predetermined rate, and the fluid emitter generates fluid droplets that travel in a second direction opposite from the direction the object travels.

15. The system of claim 13, wherein the fluid emitter is placed by creating the fluid emitter at the boundary by dilating the boundary in a direction normal to a surface of the object.

16. The system of claim 15, wherein the fluid emitter generates a stream of new fluid that travels along the surface of the object.

* * * * *